United States Patent

Aoki et al.

[11] Patent Number: 5,994,806
[45] Date of Patent: Nov. 30, 1999

[54] ARMATURE STRUCTURE FOR MOTOR

[75] Inventors: Susumu Aoki, Kiryu; Tadao Kodaira, Maebashi; Tsugio Onodera, Gunma, all of Japan

[73] Assignee: Mitsuba Corporation, Gunma, Japan

[21] Appl. No.: 08/930,454

[22] PCT Filed: Nov. 19, 1996

[86] PCT No.: PCT/JP96/03385

§ 371 Date: Sep. 11, 1997

§ 102(e) Date: Sep. 11, 1997

[87] PCT Pub. No.: WO97/25764

PCT Pub. Date: Jul. 17, 1997

[30] Foreign Application Priority Data

Jan. 12, 1996 [JP] Japan ................................. 8-022048

[51] Int. Cl.[6] .............................. H02K 7/06; H02K 1/22
[52] U.S. Cl. ............................................. 310/80; 310/264
[58] Field of Search ................................ 310/80, 83, 61, 310/261, 90, 264

[56] References Cited

U.S. PATENT DOCUMENTS

| | | | |
|---|---|---|---|
| 2,696,579 | 12/1954 | Van Der Veer | 310/83 |
| 2,763,797 | 9/1956 | Dean | 310/83 |
| 4,521,707 | 6/1985 | Baker | 310/80 |
| 4,929,858 | 5/1990 | Konishi | 310/83 |
| 5,013,950 | 5/1991 | Isozumi | 310/83 |
| 5,396,757 | 3/1995 | Kobayashi et al. | 310/80 |
| 5,532,535 | 7/1996 | Oltmanns | 310/90 |
| 5,554,899 | 9/1996 | Teramachi | 310/80 |
| 5,796,198 | 8/1998 | Sugino et al. | 310/89 |

FOREIGN PATENT DOCUMENTS

| | | |
|---|---|---|
| 3-293947 | 12/1991 | Japan . |
| 06327190 | 11/1994 | Japan . |
| 3007926 | 12/1994 | Japan . |
| 7-123631 | 5/1995 | Japan . |
| 07215226 | 8/1995 | Japan . |

*Primary Examiner*—Clayton LaBalle
*Attorney, Agent, or Firm*—Skjerven, Morrill, MacPherson, Franklin & Friel LLP; Alan H. MacPherson; Hugh H. Matsubayashi

[57] ABSTRACT

In the motor armature arrangement according to the present invention, because the inner diameter (D2) of one of the axially end portions (3c) of the armature shaft (3) is reduced from the inner diameter (D1) of the motor core mounting portion (3b), the one axially end portion (3c) for mounting a bearing (8b) may be provided with a large wall thickness so that a sufficient mechanical strength can be achieved for the part for mounting the bearing without increasing the outer diameter thereof.

11 Claims, 2 Drawing Sheets

ARMATURE STRUCTURE FOR MOTOR

TECHNICAL FIELD

The present invention relates to a motor armature arrangement for a motor comprising a tubular armature shaft.

BACKGROUND OF THE INVENTION

The motor armature shaft for an electric motor may consist of a hollow tubular member to allow another shaft to be passed inside the bore of the armature shaft, for instance, as disclosed in Japanese patent laid-open (kokai) publication No. 6-39473 by the same Applicant. Such a motor armature shaft is normally formed with a serration on an outer circumferential surface thereof by placing a tubular member in a bore of a forming die formed with a serration on a part of an inner surface thereof, and squeezing a forming punch axially through the tubular member so that the inner surface of the tubular member may be formed into a prescribed configuration while the serration is formed on the outer circumferential surface of the tubular member. An armature core can be therefore securely attached to the outer circumferential surface of the tubular member via the serration.

It is also known, as disclosed in Japanese patent laid-open (kokai) publication No. 5-260704, to loosely fit an armature core, having a serration on an inner surface of a bore defined therein, on a tubular armature shaft, and squeeze a forming punch axially through the inner bore of the armature shaft so as to force the armature shaft into an outward plastic deformation, and integrally join the armature core and the armature shaft by bringing the material of the armature shaft in close contact with the serration on the inner circumferential surface of the bore of the armature core. According to this previous proposal, the outer diameter of the armature shaft and the inner diameter of the armature core may be defined with a certain dimensional tolerance, and the dimensional control during the manufacturing process can be simplified.

However, according to the armature shaft having the above described structure, because the part of the armature shaft, which receives the part of the maximum outer diameter of the other shaft, must have a larger inner diameter than this maximum outer diameter, when an attempt is made to minimize the diameter of the armature shaft carrying the armature core insofar as necessary to ensure a sufficient cross sectional area for the magnetic path, the wall thickness of the axially, or axial, end portion of the armature shaft for mounting a bearing is reduced as a result. The reduction in the wall thickness of this part of the armature shaft may cause this part to be inwardly deformed as a nut for securing the bearing is fastened, and the nut may not be able to achieve a required fastening force.

If the wall thickness of the tubular shaft is increased so that a desired mechanical strength may be achieved at the axial end thereof, the outer diameter of the armature shaft necessarily increases, and the outer diameter of the armature core has to be increased so as to ensure a sufficient magnetic path. This leads to an increase in the outer diameter and the weight of the motor.

Thus, a primary task of the present invention is to provide a motor armature arrangement for an electric motor which allows a sufficient mechanical strength to be achieved while minimizing the outer diameter of the motor.

BRIEF SUMMARY OF THE INVENTION

To accomplish such a task, the present invention provides a motor armature arrangement, comprising a tubular armature shaft (3) including a motor core mounting portion (3b) provided on an outer circumferential surface of an axially, or axial, middle portion of thereof, and a bearing mounting portion provided on one of axially end portions (3c) thereof, characterized by that: an inner diameter (D2) of one of the axially end portions (3c) of the armature shaft (3) is reduced in diameter from a diameter (D1) of the motor core mounting portion (3b).

Therefore, when a bearing fastening nut (11) is threaded onto the armature shaft (3) to secure a bearing (8b) thereto, the wall thickness of the axially end portion of the armature shaft (3), that is necessary to withstand the inward deformation force caused by the fastening of the bearing fastening nut (11), can be ensured without increasing the outer diameter of the armature shaft (3).

Another feature of the present invention is achieved by providing an annular groove (16) in the one axially end portion (3c) of the armature shaft (3) having the inner diameter (D2) for retaining a stop ring (15) which serves as positioning means for positioning a bearing (8b) fitted on the axially end portion (3c) in cooperation with a bearing fastening nut (11), and a threaded portion (12) in a more axially end side of the armature shaft (3) for threadably engaging the bearing fastening nut (11), the part of the axially end portion (3c) provided with the annular groove (16) being provided with substantially the same inner diameter (D2) as the remainder of axially end portion (3c).

The bearing (8b) for supporting the armature shaft (3) is typically mounted on the axially end portion (3c) of the armature shaft (3), and is required to be positioned in its installed state. To properly position the bearing (8b), a collar (14) and a stop ring (15) are provided toward the motor core mounting portion (3b) side of the armature shaft (3) as positioning means, and the bearing (8b) is interposed between the positioning means and the bearing fastening nut (11) so as to properly position and secure the bearing (8b). Therefore, even though the part of the axially end portion of the armature shaft formed with the annular groove (16) for retaining the stop ring (15) may be reduced in the wall thickness by the depth of the groove, because the uniform inner diameter (D2) of the axially end portion (3c) extends to this part, the part, where the wall thickness is reduced due to the provision of the annular groove (16) and is therefore made susceptible to stress concentration, can be ensured with a sufficient mechanical strength.

Yet another feature of the present invention can be provided by an arrangement wherein a ball thread (9), formed in a part of a rack shaft (2) passed through the armature shaft (3) in an axially moveable manner, and a ball nut (10), provided in an enlarged diameter portion (3a) formed in the other axially end portion of the armature shaft (3) opposite from the one axially end portion (3c), jointly form a ball nut mechanism so as to engage the armature shaft (3) and the rack shaft (2) with each other, the inner diameter (D2) of the one axially end portion (3c) of the armature shaft (3) being smaller than an outer diameter (d1) of a portion of the rack shaft (2) provided with the ball thread (9) but larger than an outer diameter of a straight portion (2a) of the rack shaft (2) which is passed through the one axially end portion (3c).

It suffices for the axially end portion (3c) to have an inner diameter (D2) sufficent to allow the straight portion (2a) to be passed through the straight portion (2a) being reduced in diameter from the part of the rack shaft (2) provided with the ball screw thread (9). Thus, even when the axially end portion (3c) is provided with a threaded portion for threadably engaging the nut (11) for fastening the bearing, the wall thickness of the axially end portion can be made greater than that of the part of the armature shaft (3) for receiving the part of the rack shaft (2) provided with the ball screw thread (9).

The various features and advantages of the present invention will be described in the following with reference to the appended drawings.

DETAILED DESCRIPTION OF THE PREFERRED EMBODIMENTS

Now the preferred embodiment of the present invention is described in the following with reference to the appended drawings.

Figure 1:
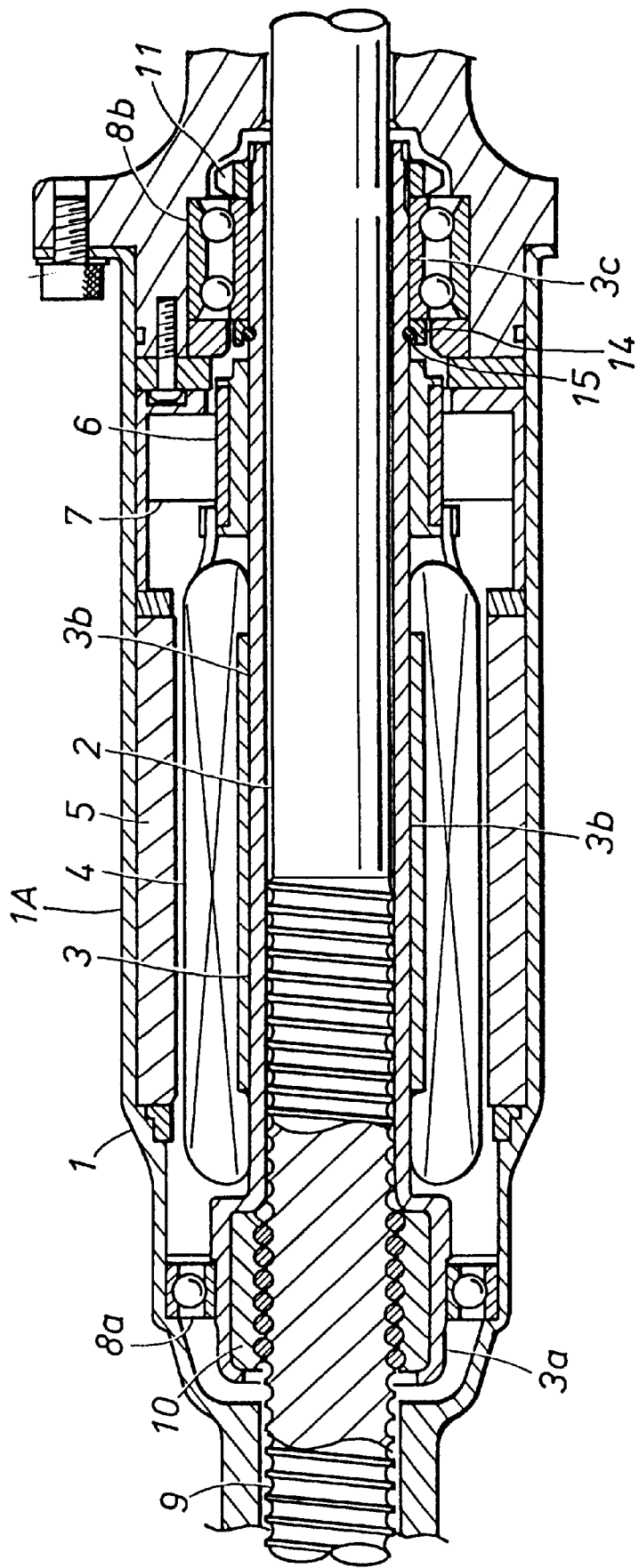
FIG. 1 is a longitudinal sectional view of an essential part of the electric motor used for the automotive electric power steering device.

FIG. 1 is a longitudinal sectional view of the electric motor, for instance, used for an automotive electric power steering device. Referring to FIG. 1, the casing 1 receives a laterally extending rack shaft 2, and two axial ends (not shown in the drawing) of the rack shaft 2 are connected to the right and left front wheels via tie rods. The casing 1 also receives a tubular armature shaft 3 which coaxially surrounds the rack shaft 2.

The outer circumferential surface of a middle portion of the armature shaft 3 fixedly carries an armature core which forms a motor core, and armature coils are wound around core teeth of the armature core. This assembly is integrally secured by a coating material not shown in the drawing to form a rotor assembly 4. The inner circumferential surface of a part 1A of the casing 1 corresponding to the rotor assembly 4 is provided with magnets 5 so that a field assembly is formed by the magnets 5 and the part 1A of the casing 1.

The armature shaft 3 fixedly carries a commutator 6 adjacent to the rotor assembly 4, and brushes 7 are provided on the inner circumferential surface of a part of the casing 1 opposing the commutator 6. The two axial ends of the armature shaft 3 are respectively supported by bearings 8a and 8b in a freely rotatable manner.

One of the axial ends of the armature shaft 3 is enlarged in diameter, and this enlarged diameter portion 3a is supported by one of the bearings 8a. The part of the armature shaft 3 extending between the middle portion 3b carrying the armature core and the other axially end portion 3c defines an outer circumferential surface of a substantially uniform diameter.

The rack shaft 2 is formed with a ball thread 9 over about one half the axial length thereof, and a ball nut 10 is press fitted and securely crimped in the enlarged diameter portion 3a of the armature shaft 3 so that a ball nut mechanism is formed by interposing a plurality of balls between them. Therefore, as the armature shaft 3 rotates in either direction, the rack shaft 2 is axially moved in a corresponding direction via the ball nut mechanism. The axially end portion of the rack shaft 2 remote from the side formed with the ball thread 9 is slidably supported, and connected to a steering mechanism although it is not shown in the drawing.

Figure 2:
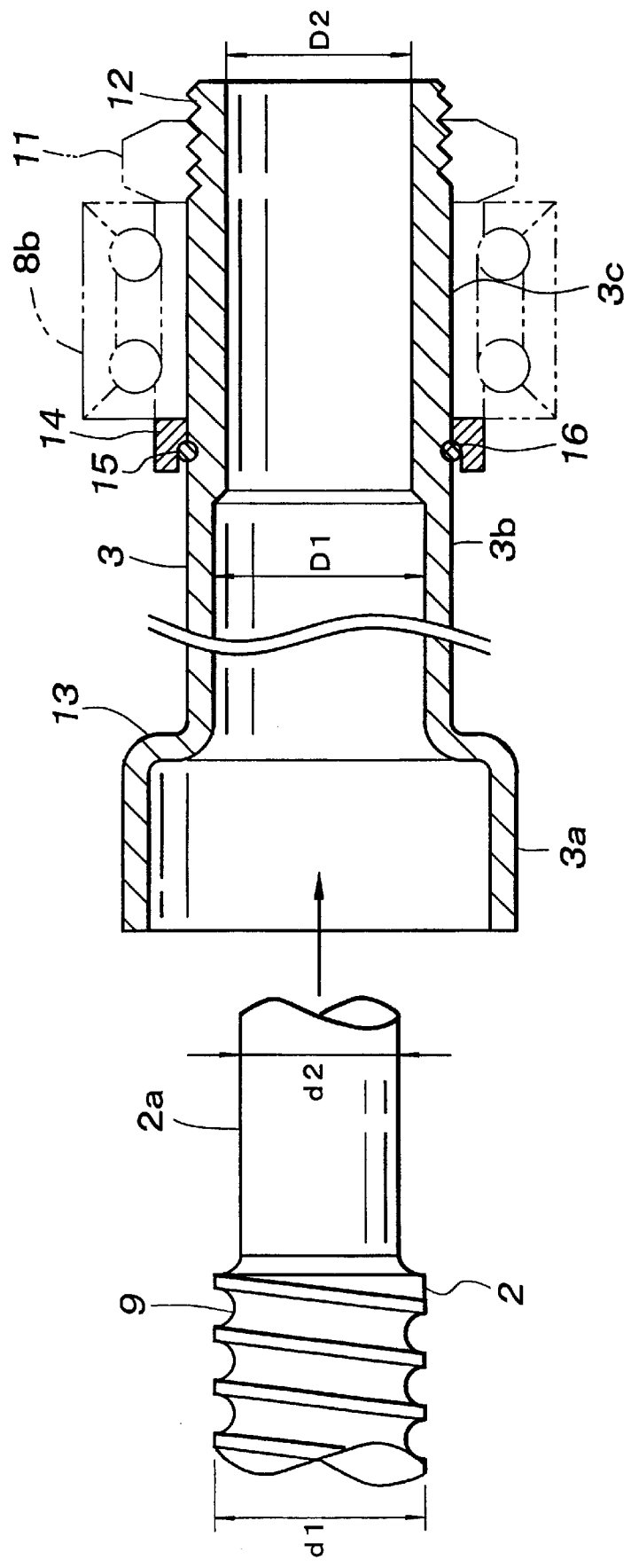
FIG. 2 is a longitudinal sectional view showing an essential part of the armature shaft 3 with some exaggeration.

As illustrated in FIG. 2 in a somewhat exaggerated manner, the inner circumferential surface of the armature shaft 3 has a smaller inner diameter D2 at the axially end portion 3c supported by the bearing 8b than the diameter D1 at the middle portion 3b thereof carrying the armature core. The axially end portion 3c of the armature shaft 3 is provided with a threaded portion 12 for engaging a nut 11 for securing the bearing 8b.

Referring to FIG. 2, a collar 14 is fitted on the armature shaft 3 so that, when the bearing 8b is installed at the axially end portion 3c of the armature shaft 3, the middle portion 3b of the armature shaft 3 may be properly positioned, and the bearing 8b may be secured against any axial movement by interposing the bearing 8b between the fastening nut 11 and the collar 14. A stop ring 15 for preventing the movement of the collar 14 toward the middle portion 3b is fitted into an annular groove 16 extending circumferentially over the entire circumference of the armature shaft 3. The stop ring 15 may also consist of a C-ring or a E-ring.

According to the illustrated embodiment, because a shoulder surface 13 is defined between the enlarged diameter portion 3a and the middle portion 3b, a forming punch can be axially introduced from the end of the enlarged diameter portion 3a with a stepped portion of the punch abutting the shoulder surface 13 as indicated by the arrow in a similar manner as the prior art, and can squeeze the armature shaft 3 so as to form a serration on the outer circumferential surface of the armature shaft, and the armature core can be fixedly secured to the armature shaft either by press fitting or squeezing. In this conjunction, the bore of the forming die for receiving the middle portion 3b and the axially end portion 3c is provided with a substantially uniform diameter, and the middle portion 3b and the axially end portion 3c are formed with different forming punches having diameters D1 and D2, respectively. The punch with the diameter of D1 is prevented from squeezing the axially end portion 3c.

The outer diameter of the middle portion 3b is dictated by the inner diameter of the core whose outer diameter is in turn dictated by the required performance of the motor. The wall thickness of the middle portion 3b is large enough to conduct the prescribed amount of magnetic flux while the inner diameter D1 of the middle portion 3b is uniform and slightly larger than the outer diameter d1 of the threaded portion 9 of the rack shaft 2. The part given with the inner diameter of D1 does not reach the part provided with the annular groove 16 for receiving the stop ring 15. Therefore, the wall thickness of the axially end portion 3c of the armature shaft 3 associated with the bearing 8b is relatively large over the entire axial length of the bearing 8b. Therefore, a sufficient mechanical strength can be ensured not only for this part but also for the part of the armature shaft 3 which is thin walled due to the provision of the annular groove 16.

The inner diameter D2 of the axially end portion 3c of the armature shaft 3 is smaller than the outer diameter d1 of the threaded portion 9 of the rack shaft 2, but larger than the outer diameter d2 of the straight portion 2a of the rack shaft 2 so as to allow the passage of the straight portion 2a, but not the threaded portion 9 (D1>d1>D2>d2). By so doing, the wall thickness of the axially end portion 3c for mounting the bearing can be maximized, and the rack shaft 2 is allowed to have a sufficient stroke even when the armature shaft is formed from a tubular shaft of a uniform outer diameter.

We claim:

1. A motor armature arrangement, comprising a tubular armature shaft (3) including a motor core mounting portion (3b) provided on an outer circumferential surface of an axial middle portion thereof, and a bearing mounting portion provided on a first axial end portion (3c) thereof, characterized in that:

an inner diameter (D2) of the first axial end portion (3c) of the armature shaft (3) is less than an inner diameter (D1) of the motor core mounting portion (3b), and an outer diameter of the first axial end portion (3c) of the armature shaft (3) is substantially equal to an outer diameter of the motor core mounting portion (3b).

2. A motor armature arrangement according to claim 1, wherein the the first axial end portion (3c) of the armature shaft (3) having the inner diameter (D2) is provided with an annular groove (16) for retaining a stop ring (15) which serves as positioning means for positioning a bearing (8b) fitted on the the first axial end portion (3c) in cooperation with a bearing fastening nut (11).

3. A motor armature arrangement according to claim 1 or 2, wherein a ball thread (9), formed in a portion of a rack shaft (2) passed through the armature shaft (3) in an axially moveable manner, and a ball nut (10), provided in an enlarged diameter portion formed in a second axial end portion (3a) of the armature shaft (3) opposite from the first axial end portion (3c), jointly form a ball nut mechanism so as to engage the armature shaft (3) and the rack shaft (2) with each other, the inner diameter (D2) of the one axially end portion (3c) of the armature shaft (3) being smaller than an outer diameter (d1) of the portion of the rack shaft (2) provided with the ball thread (9) but larger than an outer diameter of a straight portion (2a) of the rack shaft (2) which is passed through the first axial end portion (3c).

4. A motor armature arrangement according to claim 1, wherein inner circumferential surfaces of the motor core mounting portion (3b) and the first axial end portion (3c) of the armature shaft (3) are squeeze formed by using different forming punches having corresponding outer diameters (D1, D1).

5. A motor armature arrangement according to claim 3, wherein inner circumferential surfaces of the motor core mounting portion (3b) and the first axial end portion (3c) of the armature shaft (3) are squeeze formed by using different forming punches having corresponding outer diameters (D1, D1).

6. A motor armature arrangement, comprising:

a tubular armature shaft having a first axial end portion, a second axial end portion, and a middle portion disposed axially between the first end portion and the second end portion;

a motor core mounting portion provided on an outer circumferential surface of the middle portion of the tubular armature shaft; and a bearing mounting portion provided on an outer circumferential surface of the first axial end portion of the tubular armature shaft;

wherein a wall thickness of the tubular armature shaft is thicker along the motor core mounting portion than a wall thickness of the tubular armature shaft along the bearing mounting portion.

7. A motor armature arrangement according to claim 6, wherein an outer diameter of the tubular armature shaft at the motor core mounting portion is substantially equal to an outer diameter of the tubular armature shaft at the bearing mounting portion.

8. A motor armature arrangement according to claim 6, wherein an inner diameter of the tubular armature shaft at the motor core mounting portion is larger than an inner diameter of the tubular armature shaft at the bearing mounting portion.

9. A motor armature arrangement according to claim 6, further comprising: an annular groove formed in the first axial end portion of the tubular armature shaft;

a stop ring retained by said annular groove;

a bearing fastening nut fitted to the first axial end portion of the tubular armature shaft; and a bearing fitted on the first axial end portion of the tubular armature shaft, said bearing being forced into abutment with said stop ring by said bearing fastening nut.

10. A motor armature arrangement according to claim 6, further comprising:

a rack shaft passed through the tubular armature shaft in an axially moveable manner, said rack shaft having a ball thread portion and a straight portion, wherein said straight portion passes through the first axial end portion of the tubular armature shaft;

a ball nut provided in an enlarged diameter portion formed in the second axial end portion of the tubular armature shaft;

wherein said ball thread portion of the rack shaft and said ball nut jointly form a ball nut mechanism so as to engage the tubular armature shaft and the rack shaft with each other; and an inner diameter of the first axial end portion of the armature shaft is smaller than an outer diameter of the ball thread portion of the rack shaft, and larger than an outer diameter of the straight portion of the rack shaft.

11. A motor armature arrangement according to claim 6, wherein an inner circumferential surface of the motor core mounting portion and an inner circumferential surface of the first axial end portion are squeeze formed by using different forming punches having corresponding outer diameters.

* * * * *